Patented Feb. 9, 1932

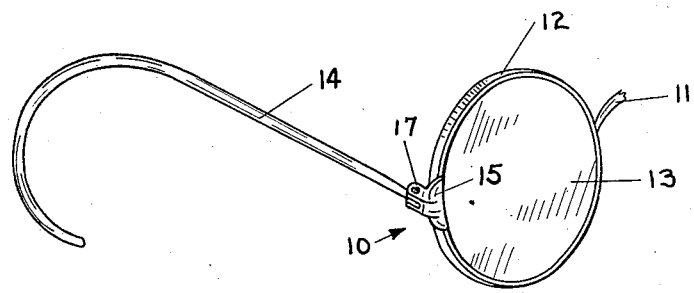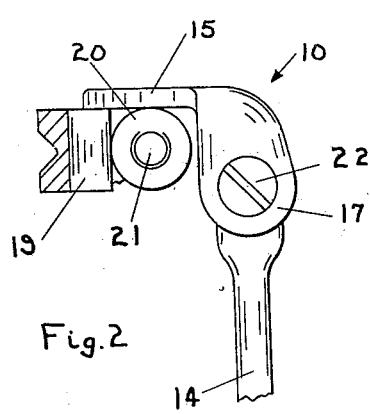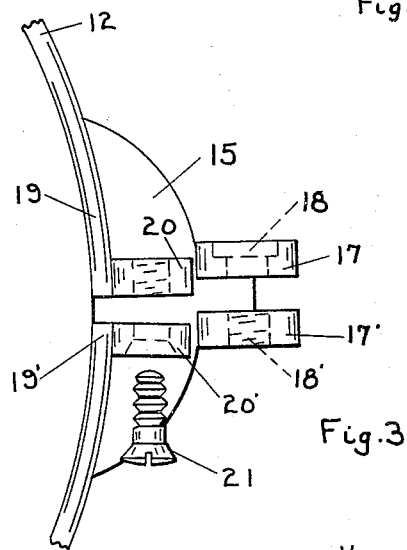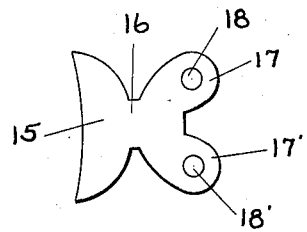

1,844,143

UNITED STATES PATENT OFFICE

SAMUEL E. BOUCHARD, OF ROCHESTER, NEW YORK, ASSIGNOR TO BAUSCH & LOMB OPTICAL COMPANY, OF ROCHESTER, NEW YORK, A CORPORATION OF NEW YORK

OPHTHALMIC MOUNTING

Application filed May 9, 1930. Serial No. 451,017.

This invention relates to ophthalmic mountings and more particularly it has reference to end pieces or temple connections for spectacle frames.

One of the objects of my invention is to provide an improved type of end piece which will present a neat appearance and can be readily manufactured. Another object is to provide an improved end piece of simple structure which will permit the removal of the lens without disturbing the temple or vice versa. These and other objects reside in certain novel features of construction, arrangement and combination of parts as will hereinafter be more fully disclosed and pointed out in the appended claims.

Referring to the drawings:

Fig. 1 is a fragmentary perspective view of a spectacle frame showing my improved end piece.

Fig. 2 is a top plan view of my end piece with parts broken away.

Fig. 3 shows a rear elevation of my end piece with parts in separate relation and with the temple removed.

Fig. 4 is a plan view of a flat stamping before being formed.

A preferred embodiment of my invention is illustrated in the drawings wherein my end piece, indicated generally at 10, is shown applied to a pair of spectacles embodying the usual bridge 11, eye wire 12 carrying lens 13 and the pivotally mounted temple 14. The end piece 10 may be made by blanking out of flat stock the stamping, shown in Fig. 4, which has a plate portion 15, a restricted neck portion 16 and two ears 17 and 17' having screw holes 18 and 18'.

The ears 17 and 17' are bent up into a substantially parallel relationship so that the screw holes 18 and 18' are in alignment. The end 19 of the split eye wire 12 is then secured, by soldering or other suitable means, to the rear side of the plate portion 15 as shown in Fig. 3. The free end 19' of the eye wire 12 carries the lug 20' which is adapted to be brought into contact with lug 20 on end 19 and held in position by means of screw 21. The temple 14 is pivotally mounted between the ears 17 and 17' by means of the screw 22.

From the foregoing it will be apparent that I am able to attain the objects of my invention and provide an improved, neat appearing end piece structure which can be readily manufactured. The temple 14 can be removed by withdrawing screw 22 and the lens can be removed by merely withdrawing screw 21. The structure presents a neat appearance as the seam or joint, which appears on the usual type of end piece, has been eliminated. The plate portion 15 of the end piece provides a rigid, durable construction and also serves to conceal the lugs and screw which hold the split eye wire together. The front surface of the plate portion can be engraved or provided with other suitable ornamentation, if desired. Various modifications can obviously be made without departing from the spirit of my invention as pointed out in the appended claims.

I claim:

1. In an ophthalmic mounting the combination of a member comprising a substantially vertical plate portion and spaced integral ears, a temple pivotally mounted on said ears, lens holding means comprising separable members, one of said members being rigidly secured to the rear surface of said plate portion.

2. An ophthalmic mounting comprising a split eye wire having two adjacent ends, means for securing said ends together to hold a lens in said eye wire, a member having a substantially vertical plate portion and spaced integral, rearwardly extending ears, a temple mounted between said ears, one of said ends being secured to the rear face of the plate portion of said member.

3. In an ophthalmic mounting the combination of a split eye wire having two ends, lugs secured to said ends, threaded means for holding said lugs together, a member having a plate portion, said member having rearwardly projecting integral ears carrying a temple, one of the ends of said eye wire being secured to the rear face of the plate portion of said member.

SAMUEL E. BOUCHARD.